(12) United States Patent
Johnson

(10) Patent No.: US 8,045,419 B1
(45) Date of Patent: Oct. 25, 2011

(54) METHOD FOR MITIGATING SPATIAL ALIASING

(75) Inventor: Mary H. Johnson, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 114 days.

(21) Appl. No.: 12/460,909

(22) Filed: Oct. 15, 2009

(51) Int. Cl.
*G01S 3/80* (2006.01)

(52) U.S. Cl. .................................................. 367/130

(58) Field of Classification Search .................. 367/130, 367/106
See application file for complete search history.

(56) References Cited

U.S. PATENT DOCUMENTS 6,590,833 B1 * 7/2003 Teller ............................ 367/125
7,139,221 B1 * 11/2006 Carter et al. ................. 367/125

* cited by examiner

*Primary Examiner* — Daniel Pihulic

(74) *Attorney, Agent, or Firm* — James M. Kasischke; Jean-Paul A. Nasser; Michael P. Stanley

(57) ABSTRACT

The invention as disclosed is a method for mitigating spatial aliasing that takes advantage of the forward motion of towed array elements to overcome the frequency constraints imposed on beam forming by the spatial separation of the array elements. The method employs the motion of a towed array of hydrophones to generate at least one synthetic array element to compensate for spatial under sampling.

6 Claims, 2 Drawing Sheets

METHOD FOR MITIGATING SPATIAL ALIASING

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention is directed to towed arrays of hydrophones. In particular, the present invention is directed to a method for mitigating spatial aliasing that takes advantage of the forward motion of towed array elements (hydrophones) to overcome the frequency constraints imposed on beam forming by the spatial separation of the array elements.

(2) Description of the Prior Art

The Nyquist criterion describes the sampling rate required for a given frequency without aliasing. Similarly, if an array of sensors (hydrophones) is coherently processed to determine the direction of an incoming acoustic signal through beam forming, then the separation of the array elements determines the maximum frequency that can be processed without producing an alias in direction. If the beam forming limits are exceeded, however, spatial aliasing occurs in the form of grating lobes as graphically illustrated that interfere with the interpretation of the direction of the incoming signal. Grating lobes appear at an aliased look direction that is a function of both source direction and frequency, so a loud, multi-tonal signal will produce grating lobes that are present at multiple look directions, interfering with the interpretation of the number of signals present. Grating lobes are caused by spatial under sampling. What is needed is a method for mitigating spatial aliasing to avoid grating lobes.

SUMMARY OF THE INVENTION

It is a general purpose and object of the present invention to mitigate spatial aliasing to avoid grating lobes from a loud, multi-tonal source. The above object is accomplished with the present invention through the use of a method that employs the motion of a towed array of hydrophones to generate at least one synthetic array element for each real sensor to compensate for spatial under sampling. Acoustic energy is detected and converted to an electronic signal by a towed array of hydrophones. This signal is processed by a data processing computer system. In the present invention, the electronic signal is processed in the data processing computer system such that it is time delayed thereby generating a synthetic element. The time delay is based on the forward motion of the array and the desired separation distance of the synthetic element along the array. The electronic signal is then filtered into frequency bins using a bank of filters, such as a fast Fourier transform (FFT) as is also done for the real sensor data. The frequency components in the medium due to the source of the electronic signal are then estimated, after which the neighborhood of frequency bins containing energy from each frequency component are identified. The energy due to each source frequency component is then phase corrected to compensate for the initial time delay that generated the synthetic element. Traditional beam forming is then performed on the signals from both the real array elements and the synthetic array elements to generate a graphical representation of a multi-tone signal that will indicate the source direction and look direction associated with an acoustic source that is detected by the towed array of hydrophones.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 1:
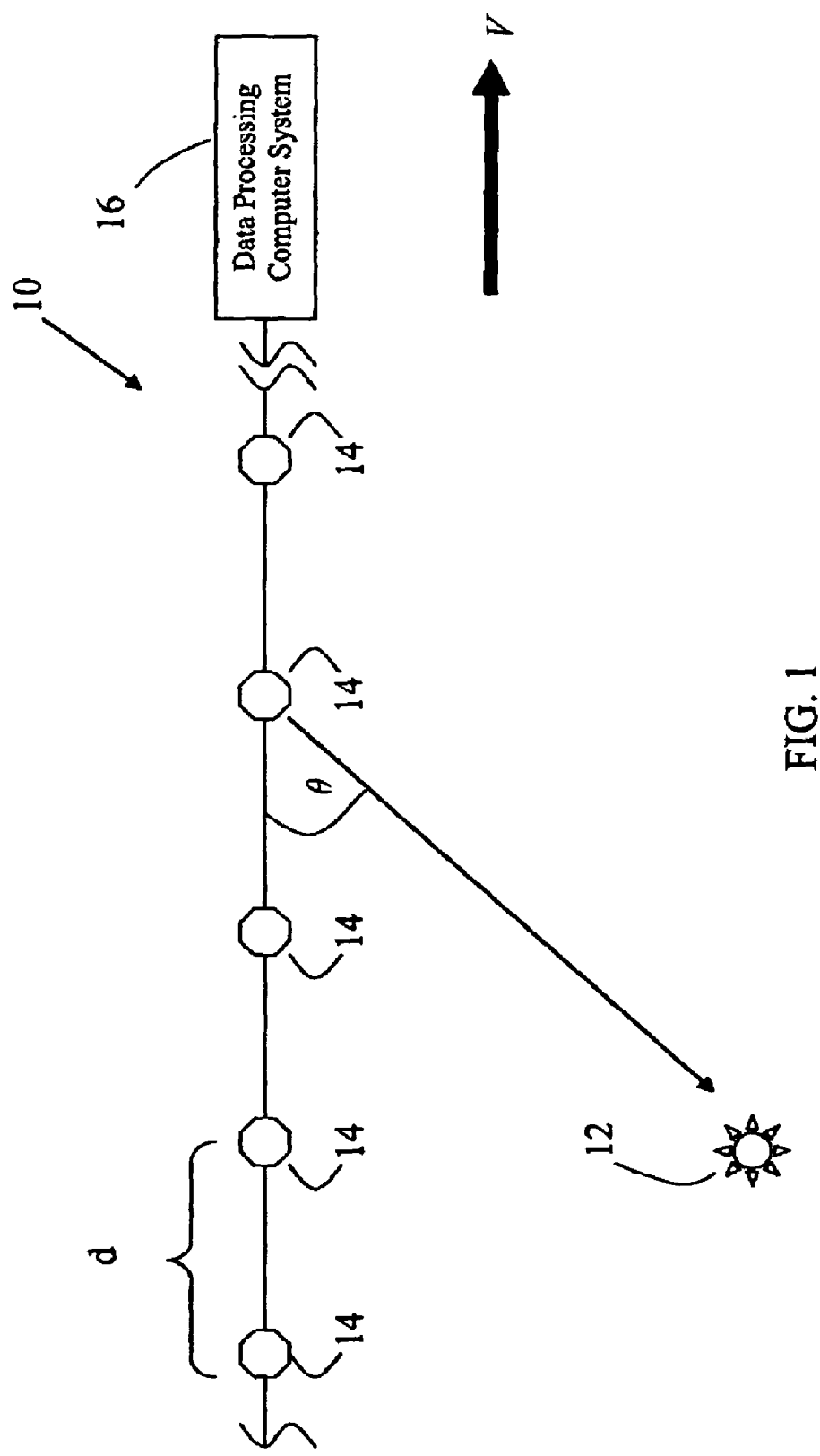
FIG. 1 illustrates a towed array of hydrophones for use with the method of the present invention.

Referring to FIG. 1 there is illustrated a towed array of hydrophones 10 moving underwater in a particular direction as indicated by the arrow at a velocity V. In one embodiment the array is being towed by an underwater vehicle. There is also illustrated an underwater acoustic energy source 12 generating acoustic energy. In one embodiment, this energy source could be a surface vessel or an underwater vessel. The hydrophones 14 detect the acoustic energy at a look direction or look angle θ and convert it to a digital electronic signal. The towed array 10 is connected to a data processing computer system 16.

Figure 2:
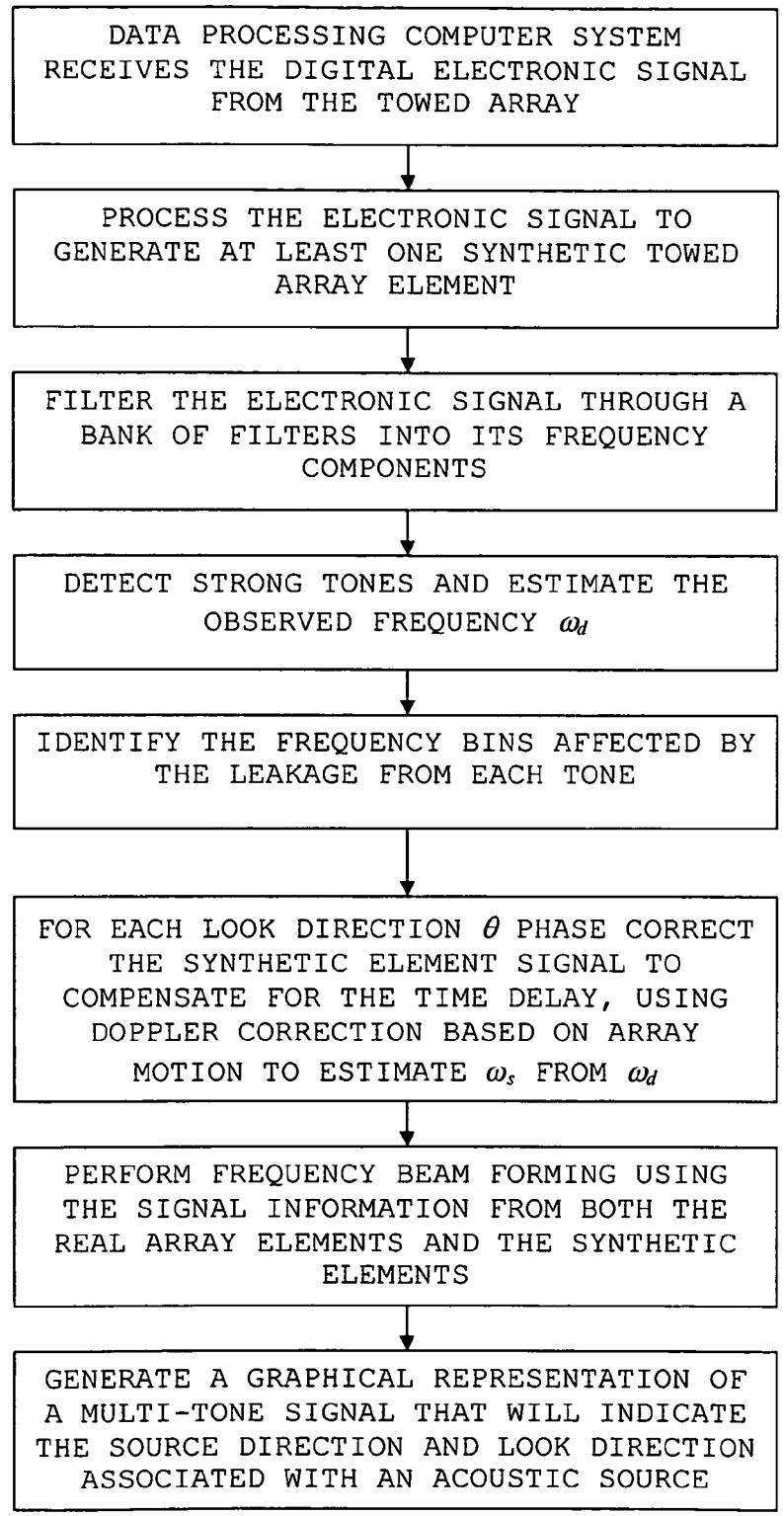
FIG. 2 illustrates a flow diagram of the steps of the method of the present invention.

Referring to FIG. 2 there is illustrated an embodiment of the method for mitigating spatial aliasing in the form of a flow diagram. The first step 100 of the method is for the data processing computer system 16 to receive the digital electronic signal from the towed array of hydrophones 10.

The second step 200 is to process the electronic signal in order to generate at least one synthetic towed array element for each real sensor, wherein the synthetic array element will allow for more sampling. The processing involves time delaying the electronic signal received from the towed array 10. The time delay is accomplished according to the following formula: $\Delta_t = d/2V$. Wherein V is the speed of the motion of the towed array 10 and d is the current separation distance between the physical array elements (hydrophones) 14 in the towed array 10 as illustrated in FIG. 1. The acoustic signals or samples received by the physical array elements 14 are represented as follows: $x_m[n]$ sampled from $x_m(t)$. The samples assigned to the synthetic elements as a result of the time delay are $$x_{m-\frac{1}{2}}[n]$$

sampled from $x_m(t+\Delta_t)$ by interpolating and time delaying, $x_m[n]$. Wherein $\Delta_t$ denotes the time delay. In this embodiment, but without loss of generality, the separation distance d (as illustrated in FIG. 1) is divided by two to establish a desired spacing d/2 between the physical array elements 14 and synthetic array elements. The sampling rate is assumed to be at least twice that required by the Nyquist criterion for the design frequency of the array 10. For the purposes of beam forming, a frequency component of the signal received by the $m^{th}$ synthetic elements is represented as follows:

$$s_m(k_s, t_1) = S_0 e^{j\omega_s t_1} e^{-jk_s \cdot r_m(t_1)},$$

where $t_1 = t_0 - \Delta_t$ and $r_m(t_1) = r_m(t_0) + V\cos(\theta_s)\Delta t$ so that if $$\Delta_t = \frac{d}{2V},$$

then $$s_m(k_s, t_1) = s_m(k_s, t_0) e^{-jk_s \frac{d}{2}\cos\theta_s} e^{-j\omega_s \frac{d}{2V}}.$$

Wherein $\theta_s$ represents the angle between the heading of the array and the acoustic source, and where $k_s$ is $\omega_s/c$, where c is the speed of sound in the medium of water. The desired signal can be estimated at synthetic element $$m - \frac{1}{2}, s_{m-\frac{1}{2}}(k_s, t_0), \text{ by } s_m(k_s, t_1) e^{j\omega_s \frac{d}{2V}}.$$

The third step 300 is to filter the electronic signal received from the towed array through a bank of filters into its frequency components. In a preferred embodiment, the bank of filters is a fast Fourier transform (FFT). This filtering step will provide a number of frequency samples of the electronic signal in the form of frequency bins. Each towed array element 14 is associated with a set of frequency bins.

The fourth step 400 is to estimate the observed frequency $\omega_d$ due to the frequency of the original source 12. This frequency will be used to estimate the frequency in the medium, $\omega_s$, based on the Doppler shift of the movement of the towed array 10, in step 600. Strong tones are detected from the filtered electronic signal by finding peaks in the frequency coefficients, $X_m(k)$, where k is an FFT bin number from the calculation in step 300. An interpolation is performed to obtain an estimate of the observed frequency, $\omega_d$. The result of this step will be the estimates of the observed frequencies of one or more strong tones.

The fifth step 500 is to determine the neighborhood of frequency bins in which there is a significant amount of energy present from the strong tones detected in step 400. A single tone in the center of an FFT bin will produce a peak amplitude N, indicating that all of the energy is concentrated in that bin. If the tone is off center, the energy is spread over multiple bins. This spreading is known as leakage and needs to be addressed because the leakage propagates as a function of the phase of the original tone. This assertion is shown through the following calculations: If x[n] are samples of a tone defined as $$A e^{j\omega_s t},$$

where A is a magnitude of the tone, such that $x[n] = A e^{-j2\pi \hat{k} n/N}$ where $\hat{k}$ is a function of the tone frequency expressed as $$\hat{k} = N \frac{\omega_s}{2\pi f_{samp}},$$

then the discrete Fourier coefficients $$X[k] = \sum_{n=0}^{N-1} x[n] e^{-j2\pi k n/N}$$

can be shown to be of the form $$X[k] = A \frac{\sin(\pi(\hat{k} - k))}{\sin(\pi(\hat{k} - k)/N)} e^{j\pi(\hat{k}-k)(N-1)/N},$$

showing that energy from the tone is spread across all frequency bins in a phenomenon known as leakage. Most importantly, if $x_d[n]$ is sampled from the time delayed electronic signal $$A e^{j\omega_s t} e^{-j\omega_s \Delta_t},$$

the result is $$X_d[k] = X[k] e^{-j\omega_s \Delta_t},$$

where the same phase shift is present in every bin k, independent of bin frequency. Leakage is confined to a small neighborhood of bins by the application of a shading window, such as a Hanning, Hamming, or Blackman window in the discrete Fourier transform. The size of the neighborhood is determined from the width of the main lobe of the chosen shading window, a value which can be obtained from readily available published tables.

The sixth step 600 is to phase correct the synthetic element signal associated with each source frequency component for each look direction θ to compensate for the time delay of the second step 200. The correction is accomplished through the application of a phase shift, $$e^{j\omega_s \Delta_t}$$

to the frequency bins identified in the fourth step 400. In a preferred embodiment this step is performed according to the following calculations. Let one frequency component of the source 12 signal be $s(t) = e^{j\omega t}$. When source 12 and receiver (hydrophone) 14 are stationary, then $$s_m(t, r_m) = s\left(t - \frac{r_m}{c}\right) = e^{j\omega t} e^{-j\omega \frac{r_m}{c}},$$

where r is the separation and c is the sound speed. When the towed array element 14 moves toward the acoustic energy source 12 with constant speed v, r decreases at a constant rate v and the samples of s(t) are further apart.

$$s_m(t, r_m(t)) = s\left(t - \frac{r_m(t)}{c}\right) = e^{j\omega t}e^{-j\omega\frac{r_m(0)}{c}}e^{j\omega\frac{vt}{c}} = e^{j\omega t(1+\frac{v}{c})}e^{-j\phi}. \quad (1)$$

Effectively, this results in a higher observed frequency:

$$s_m(t, r_m(t)) = e^{j\omega_d t}e^{-j\phi},$$

where $\omega_d = \omega(1+v/c)$. Given the above model of a Doppler shift, the original source 12 frequency $\omega_s$ can be estimated using the speed of the towed array 10. Given $$s_m(t, r_m(t)) = e^{j\omega_d t}e^{-j\phi} \text{ and } \omega_d = \omega_s\left(1 + \frac{v\cos\theta_s}{c}\right),$$

where $\theta$ is the look angle of the source. Then, in order to estimate the signal received at a fixed location with a time delay, a phase correction is applied based on the frequency in the medium.

$$s_{m-\frac{1}{2}}\left(t, r_{m-\frac{1}{2}}(t)\right) = \quad (2)$$

$$e^{j\omega(t-\Delta_t)}e^{-j(r_m(0)-v\cos\theta_s t)/c} = s_m\left(t-\Delta_t, r_{m-\frac{1}{2}}(t)\right)e^{-j\omega_s\Delta_t}.$$

In order to apply the phase correction $$e^{j\omega_s\Delta_t},$$

the frequency in the medium due to source 12 frequency, $\omega_s$ is approximated by $$\omega_s = \frac{\omega_d}{\left(1 + \frac{v}{c}\cos(\theta_s)\right)}.$$

The seventh step 700 is to perform frequency beam forming using the signal information from both the real array elements 14 and the synthetic elements, including the signal amplitude, the propagation of the signal to each element 14 of the towed array 10, shading and steering. This is accomplished as follows:

The usual frequency beam forming equation is applied to the real elements, $$B(\theta, k, t_0) = \sum_m X_m(k, t_0)W_m e^{jkmd\cos(\theta)} \quad (3)$$

And a modified formulation as discussed above is applied to the synthetic elements, $$B_2(\theta, k, t_0) = \sum_m \hat{X}_{m-\frac{1}{2}}(k, t_1)W_{m-\frac{1}{2}}e^{jk\left(m-\frac{1}{2}\right)d\cos(\theta)}\left(e^{j\hat{\omega}_s\Delta_t}\right) \quad (4)$$

then the real and synthetic elements are combined to create a combined equation that approximates frequency beam forming for the desired array with 2 m elements:

$$\hat{B}(\theta,k,t_0) = B(\theta,k,t_0) + B_2(\theta,k,t_1) \quad (5)$$

$$\hat{B}(\theta, k, t_0) = \quad (6)$$

$$\sum_m X_m(k, t_0)W_m e^{jkmd\cos(\theta)} + \sum_m \hat{X}_{m-\frac{1}{2}}(k, t_1)W_m e^{jk\left(m-\frac{1}{2}\right)d\cos(\theta)}\left(e^{j\hat{\omega}_s\Delta_t}\right)$$

Where $W_m$ are the beamformer shading weights and $$\hat{X}_{m-\frac{1}{2}}$$

are the FFT coefficients calculated in step 200 from the time delayed samples $$x_{m-\frac{1}{2}}[n].$$

This beam forming operation is calculated at each time update for each value of look angle, $\theta$, in the defined beam set. Since each look angle represents a hypothesis, and the estimated frequency $\omega_s$ depends on the look angle of the source, an estimate of $\omega_s$ and the resulting phase correction must be calculated for each look angle in the beam set using the formula:

$$\hat{\omega}_s = \frac{\omega_d}{\left(1 + \frac{v}{c}\cos(\theta)\right)}.$$

The eighth step 800 is to generate a graphical representation of a multi-tone signal that will indicate the source direction and look direction associated with an acoustic source that is detected by the towed array of hydrophones. In one embodiment this graphical representation can be plotted in real time on a graphical user interface that is part of the data processing computer system.

The advantage of the present invention is that it takes advantage of the additional information that already exists in towed array signal data, namely the information due to array motion. Calculating synthetic elements within the existing aperture will increase frequency coverage by effectively increasing the array element 14 population with the added benefit of mitigating failed array elements 14.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for use with a towed array of hydrophones, for mitigating spatial aliasing to better determine the direction of an incoming underwater acoustic signal comprising the steps of:

towing an array of at least one hydrophones underwater in a forward motion;

sensing acoustic energy from an acoustic energy source with said array of at least one hydrophones;

converting said acoustic energy into a digital electronic signal with said array of at least one hydrophones;

receiving said digital electronic signal with a data processing computer system joined to said towed array of hydrophones;

processing said digital electronic signal with said data processing computer system to generate at least one synthetic towed array element and assigning a signal to said at least one synthetic towed array element by time delaying the electronic signal received from the towed array of at least one hydrophones, wherein the time delay is based on the forward motion of the array of at least one hydrophones and a desired separation distance of the array of at least one hydrophones;

filtering the digital electronic signal, into its frequency components using a bank of filters;

estimating an observed source frequency $\omega_d$ based on the Doppler shift due to the movement of the towed array of hydrophones;

correcting the phase of the at least one synthetic towed array element signal associated with each source frequency component within a main lobe around each frequency component for a look direction $\theta$ of each hydrophone of the towed array of at least one hydrophones to compensate for the time delay;

performing frequency beam forming using the signals from both the array of at least one hydrophones and the at least one synthetic array element; and generating a graphical representation of a multi-tonal signal from the frequency beam forming of the array elements and the at least one synthetic array element that will indicate the source direction and look direction associated with the acoustic energy source wherein said graphical representation is displayed on a graphical user interface that is joined to the data processing computer system.

2. The method of claim 1 wherein processing said digital electronic signal with said data processing computer system to generate at least one synthetic towed array element signal by time delaying the electronic signal received from the towed array further comprises the following steps:

representing the acoustic signals received by the array of at least one hydrophones as $x_m[n]$ sampled from $x_m(t)$;

assigning to the at least one synthetic towed array element a signal as a result of the time delay expressed as $$x_{m-\frac{1}{2}}[n]$$

sampled from $x_m(t+\Delta_t)$ by interpolating and time delaying $x_m[n]$, wherein $\Delta_t$ denotes the time delay;

dividing the separation distance d by two to establish a desired spacing d/2 between array elements of the array of at least one hydrophones and at least one synthetic towed array element, wherein the sampling rate is assumed to be at least twice that required by the Nyquist criterion for the design frequency of the array of at least one hydrophones;

representing a frequency component of the signal received by the $m^{th}$ synthetic elements as $$s_m(k_s, t_1) = S_0 e^{j\omega_s t_1} e^{-jk_s \cdot r_m(t_1)},$$

where $t_1 = t_0 - \Delta_t$ and $r_m(t_1) = r_m(t_0) + V\cos(\theta_s)\Delta t$ so that if $$\Delta_t = \frac{d}{2V},$$

then $$s_m(k_s, t_1) = s_m(k_s, t_0) e^{-jk_s \frac{d}{2}\cos\theta_s} e^{-j\omega_s \frac{d}{2V}},$$

wherein $\theta_s$ represents the angle between the heading of the array of at least one hydrophones and the acoustic energy source; and estimating the signal for a at least one synthetic towed array element $$m - \frac{1}{2}, s_{m-\frac{1}{2}}(k_s, t_0), \text{ by } s_m(k_s, t_1) e^{j\omega_s \frac{d}{2V}}.$$

3. The method of claim 1 wherein the step of filtering the digital electronic signal into its frequency components using a bank of filters further comprises the step of applying a shading window to the electronic signal during the filtering process to reduce at least two side lobes due to leakage of energy into neighboring frequency bins.

4. The method of claim 2 wherein the step of estimating an observed source frequency based on the Doppler shift due to the movement of the towed array of hydrophones further comprises:

detecting at least one strong tone from the filtered electronic signal by finding peaks in the frequency coefficients, $X_m(k)$, calculated in the step of filtering the digital electronic signal into its frequency components using a bank of filters; and performing an interpolation to obtain an estimate of the observed frequency, $\omega_d$, wherein the result of this step is at least one estimate of an observed frequency of the at least one strong tone.

5. The method of claim 1 wherein the step of correcting the phase of the at least one synthetic towed array element signal associated with each source frequency component within a main lobe around each frequency component to compensate for the time delay comprises applying a phase shift, $$e^{j\omega_s \Delta_t}$$

to the frequency bins identified in the step of estimating an observed source frequency au based on the Doppler shift due to the movement of the towed array of at least one hydrophones.

6. The method of claim 5 wherein the step of applying a phase shift, $$e^{j\omega_s \Delta_t}$$

to the frequency bins identified in the step of estimating an observed source frequency $\omega_d$ based on the Doppler shift due to the movement of the towed array of at least one hydrophones comprises the steps of:

assigning one frequency component of the acoustic energy source digital electronic signal to be $s(t) = e^{j\omega t}$, wherein when the acoustic energy source and the towed array of at least one hydrophones are stationary, then $$s_m(t, r_m) = s\left(t - \frac{r_m}{c}\right) = e^{j\omega t} e^{-j\omega \frac{r_m}{c}},$$

where r is the separation and c is the sound speed;

expressing the signal of the at least one synthetic towed array element as $$s_m(t, r_m(t)) = s\left(t - \frac{r_m(t)}{c}\right) = e^{j\omega t} e^{-j\omega \frac{r_m(0)}{c}} e^{j\omega \frac{vt}{c}} = e^{j\omega t\left(1+\frac{v}{c}\right)} e^{-j\phi}$$

wherein the towed array of at least one hydrophones moves toward the acoustic energy source with constant speed v; such that r decreases at a constant rate v and the samples, of s(t) are further apart, which effectively, results in a higher observed frequency of $$s_m(t, r_m(t)) = e^{j\omega_d t} e^{-j\phi},$$

where $\omega_d = \omega(1+v/c)$;
estimating an original source frequency $\omega_s$ by using the speed of the towed array of at least one hydrophones given $$s_m(t, r_m(t)) = e^{j\omega_d t} e^{-j\phi}$$

and $$\omega_d = \omega_s\left(1 + \frac{v\cos\theta_s}{c}\right),$$

where $\theta_s$ is the look angle of the source;
applying a phase correction based on the frequency in the medium in order to estimate the signal received at a fixed location with a time delay, $\Delta_t$, according to the expression $$s_{m-\frac{1}{2}}\left(t, r_{m-\frac{1}{2}}(t)\right) = e^{j\omega(t-\Delta_t)} e^{-j(r_m(0)-v\cos\theta_s t)/c} = s_m\left(t-\Delta_t, r_{m-\frac{1}{2}}(t)\right) e^{-j\omega_s \Delta_t};$$

and
approximating the frequency in the medium due to frequency of the acoustic energy source, $\omega_s$ as $$\omega_s = \omega_d \bigg/ \left(1 + \frac{v}{c}\cos(\theta_s)\right)$$

in order to apply the phase correction $$e^{j\omega_s \Delta_t}.$$

\* \* \* \* \*